(12) United States Patent
Huang

(10) Patent No.: US 8,827,456 B2
(45) Date of Patent: Sep. 9, 2014

(54) PROJECTOR AND SPLITTING AND COMBINING UNITS THEREOF

(75) Inventor: June-Jei Huang, Taoyuan Hsien (TW)

(73) Assignee: Delta Electronics, Inc., Taoyuan Hsien (TW)

(*) Notice: Subject to any disclaimer, the term of this patent is extended or adjusted under 35 U.S.C. 154(b) by 236 days.

(21) Appl. No.: 13/475,020

(22) Filed: May 18, 2012

(65) Prior Publication Data
US 2013/0016323 A1    Jan. 17, 2013

(30) Foreign Application Priority Data

Jul. 15, 2011    (TW) .............................. 100125026 A

(51) Int. Cl.

| | |
|---|---|
| *G03B 21/00* | (2006.01) |
| *G03B 21/28* | (2006.01) |
| *H04N 13/04* | (2006.01) |
| *G02B 27/14* | (2006.01) |
| *G02B 5/04* | (2006.01) |
| *G03B 21/20* | (2006.01) |
| *G03B 33/12* | (2006.01) |
| *H04N 9/31* | (2006.01) |

(52) U.S. Cl.
CPC .............. *G02B 5/04* (2013.01); *H04N 13/0404* (2013.01); *G03B 21/2013* (2013.01); *G03B 33/12* (2013.01); *H04N 9/3164* (2013.01)
USPC .................. 353/7; 353/81; 348/52; 359/629

(58) Field of Classification Search
CPC .......... H04N 13/0434; H04N 13/0436; H04N 13/0438; G02B 27/283; G02B 27/24; G03B 35/26; G03B 33/12
USPC .............. 353/81, 33, 7, 8; 348/52, 55, 56, 54; 359/485.06, 629, 833, 834, 489.09
See application file for complete search history.

(56) References Cited

U.S. PATENT DOCUMENTS

| | | | | |
|---|---|---|---|---|
| 7,245,430 | B2* | 7/2007 | Kobayashi et al. | ............ 359/464 |
| 8,272,749 | B2* | 9/2012 | Yoon | ................................ 353/81 |
| 8,274,557 | B2* | 9/2012 | Tomita | ............................ 348/54 |
| 8,388,138 | B1* | 3/2013 | Boothroyd | ........................ 353/7 |
| 2005/0134811 | A1* | 6/2005 | Magarill et al. | ................ 353/94 |
| 2009/0059172 | A1* | 3/2009 | Hsu et al. | ......................... 353/8 |

* cited by examiner

*Primary Examiner* — William C Dowling
*Assistant Examiner* — Ryan Howard
(74) *Attorney, Agent, or Firm* — Muncy, Geissler, Olds & Lowe, P.C.

(57) ABSTRACT

A projector is provided, including a first light source, a second light source, a splitting unit, a first modulating element, a second modulating element, a projection lens unit, a projection screen and a combining unit. The first light source provides a first beam in a first state. The second light source provides a second beam in a second state. The splitting unit receives the first beam and the second beam, splitting the first beam into a first sub-beam and a second sub-beam, and splitting the second beam into a third sub-beam and a fourth sub-beam. The first modulating element receives the first sub-beam and the third sub-beam from the splitting unit. The second modulating element receives the second sub-beam and the fourth sub-beam from the splitting unit. The combining unit respectively combines the first sub-beam and the second sub-beam, and combines the third sub-beam and the fourth sub-beam.

14 Claims, 6 Drawing Sheets

PROJECTOR AND SPLITTING AND COMBINING UNITS THEREOF

CROSS REFERENCE TO RELATED APPLICATIONS

This Application claims priority of Taiwan Patent Application No. 100125026, filed on Jul. 15, 2011, the entirety of which is incorporated by reference herein.

BACKGROUND OF THE INVENTION

1. Field of the Invention

The present invention relates to a projector, and in particular relates to a 3D projector.

2. Description of the Related Art

In conventional 3D projectors, beam splitters are utilized as a light combining unit to combine light beams provided by two light sources of different time sequences. However, when the light beams are provided by the two light sources entering the conventional light combining unit, a half of the light energy of the light beams is reflected by the light combining unit, and the other half of the light energy of the light beams passes through the light combining unit. More than half of the light energy of the light beams is wasted by the conventional light combining unit.

BRIEF SUMMARY OF THE INVENTION

A projector is provided, including a first light source, a second light source, a splitting unit, a first modulating element, a second modulating element, a projection lens unit, a projection screen and a combining unit. The first light source provides a first beam in a first state. The second light source provides a second beam in a second state. The splitting unit receives the first beam and the second beam, splitting the first beam into a first sub-beam and a second sub-beam, and splitting the second beam into a third sub-beam and a fourth sub-beam. The first modulating element receives the first sub-beam and the third sub-beam from the splitting unit. The second modulating element receives the second sub-beam and the fourth sub-beam from the splitting unit. The projection screen includes a rear cylinder lens array and a diffusing surface. In the first state, the combining unit respectively receives the first sub-beam and the second sub-beam from the first modulating element and the second modulating unit, the first sub-beam and the second bus-beam travel from the combining unit, pass through a first and a second position of the projection lens unit, imaged by a cylinder lens of the rear cylinder lens array, and are projected to a first image position and second image position of the diffusing surface of the projection screen. In the second state, the combining unit respectively receives the third sub-beam and the fourth sub-beam from the first modulating element and the second modulating unit, the third sub-beam and the fourth sub-beam travel from the combining unit, pass through a third and a fourth positions of the projection lens unit, imaged by another cylinder lens of the rear cylinder lens array, and are projected to a third image position and fourth image position of the diffusing surface of the projection screen, wherein the third image position is located between the first image position and the second image position, and the second image position is located between the third image position and the fourth image position.

The projector of the embodiment of the invention utilizes the splitting unit and the combining unit which are composed by inner total reflective prisms to split and combine light beams. Additionally, traveling directions of the light beams are controlled by first and second modulating elements. The energy of the first beam and the second beam are therefore sufficiently used.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
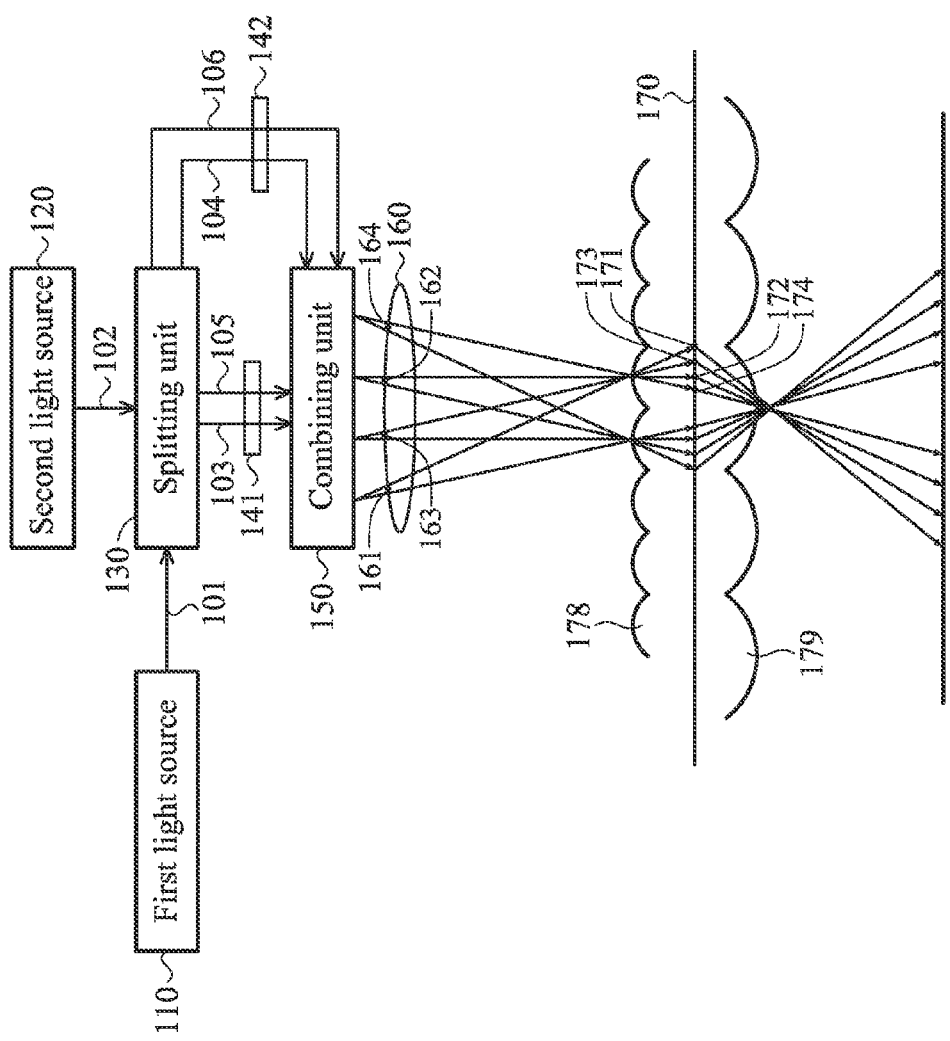
FIG. 1 shows a projector of an embodiment of the invention.

FIG. 1 shows a projector of an embodiment of the invention. The projector comprises a first light source 110, a second light source 120, a splitting unit 130, a first modulating element 141, a second modulating element 142, a combining unit 150, a projection lens unit 160, a front cylinder lens array 179, a rear cylinder lens array 178 and a diffusing surface 170. The diffusing surface 170 is located between the front cylinder lens array 179 and the rear cylinder lens array 178. The first light source 110 provides a first beam 101 in a first state. The second light source 120 provides a second beam 102 in a second state. The splitting unit 130 receives the first beam 101 and the second beam 102, splitting the first beam 101 into a first sub-beam 103 and a second sub-beam 104, and splitting the second beam 102 into a third sub-beam 105 and a fourth sub-beam 106. The first sub-beam 103 and the third sub-beam 105 pass through the first modulating element 141, and the first modulating element 141 modulates traveling directions of the first sub-beam 103 and the third sub-beam 105. The second sub-beam 104 and the fourth sub-beam 106 pass through the second modulating element 142, and the second modulating element 142 modulates traveling directions of the second sub-beam 104 and the fourth sub-beam 106.

In a first state, the combining unit 150 respectively receives the first sub-beam 103 and the second sub-beam 104 from the first modulating element 141 and the second modulating unit 142. The first sub-beam 103 and the second sub-beam 104 travel from the combining unit 150, pass through a first position 161 and a second position 162 of the projection lens unit 160, imaged by a cylinder lens of the rear cylinder lens array 178, and are projected to a first image position 171 and second image position 172 of the diffusing surface 170 of a projection screen.

In a second state, the combining unit 150 respectively receives the third sub-beam 105 and the fourth sub-beam 106 from the first modulating element 141 and the second modulating unit 142, the third sub-beam 105 and the fourth sub-beam 106 travel from the combining unit 150, pass through a third position 163 and a fourth position 164 of the projection lens unit 160, imaged by another cylinder lens of the rear cylinder lens array 178, and are projected to a third image position 173 and fourth image position 174 of the diffusing surface 170 of the projection screen. The third image position 173 is located between the first image position 171 and the second image position 172, and the second image position 172 is located between the third image position 173 and the fourth image position 174.

Figure 2:
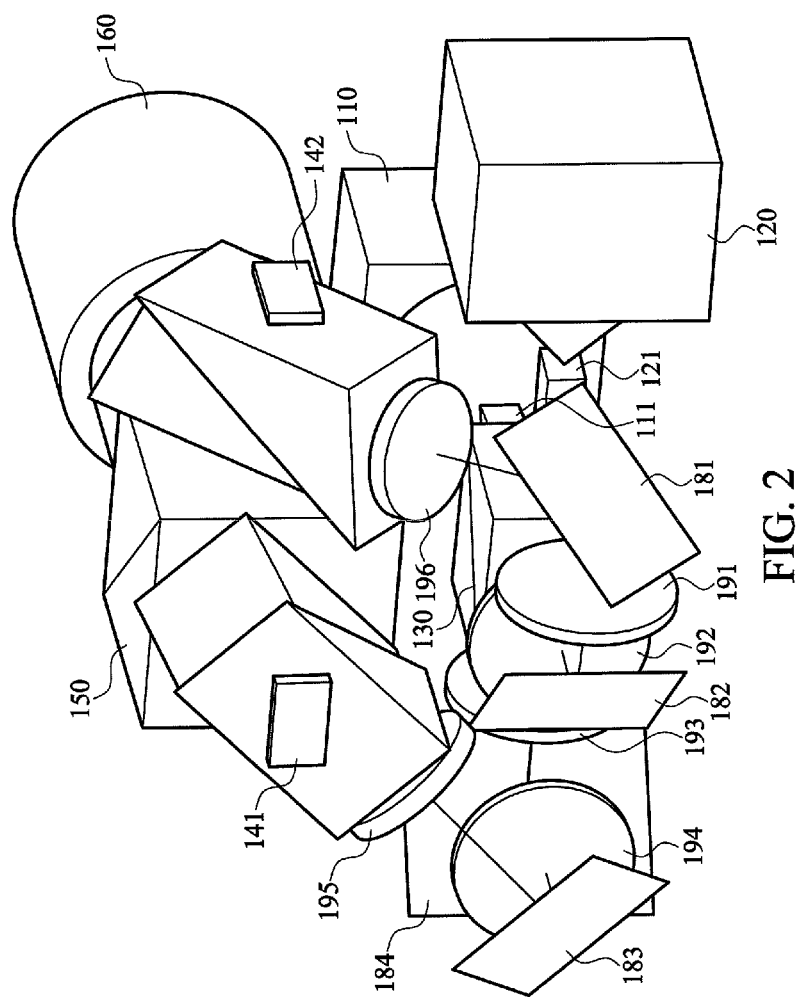
FIG. 2 is a perspective view of an optical engine of the projector of the embodiment of the invention.

FIG. 2 is a perspective view of an optical engine of the projector of the embodiment of the invention, which shows the first light source 110, the second light source 120, the splitting unit 130, the first modulating element 141, the second modulating element 142, the combining unit 150 and the projection lens unit 160. The projector of the embodiment of the invention further comprises a light pipe 111, a light pipe 121, a reflector 181, a reflector 182, a reflector 183, a reflector 184, a lens 191, a lens 192, a lens 193, a lens 194, a lens 195 and a lens 196. The light pipes, the reflectors and the lenses are utilized to control light paths and light energy distribution.

The projector of the embodiment of the invention comprises an illumination module and an image module. The illumination module comprises the first light source 110, the second light source 120 and the splitting unit 130. The image module comprises the first modulating element 141, the second modulating element 142, the combining unit 150 and the projection lens unit 160.

Figure 3A:
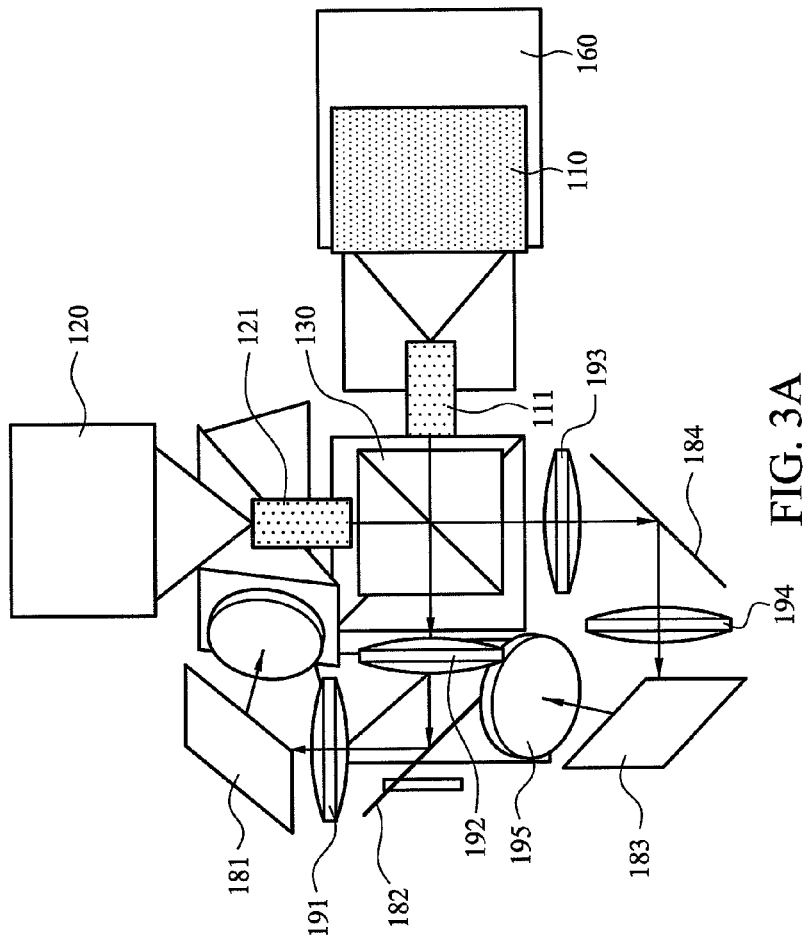
FIG. 3A shows the major elements and light paths of an illumination module of the embodiment of the invention.
Figure 3B:
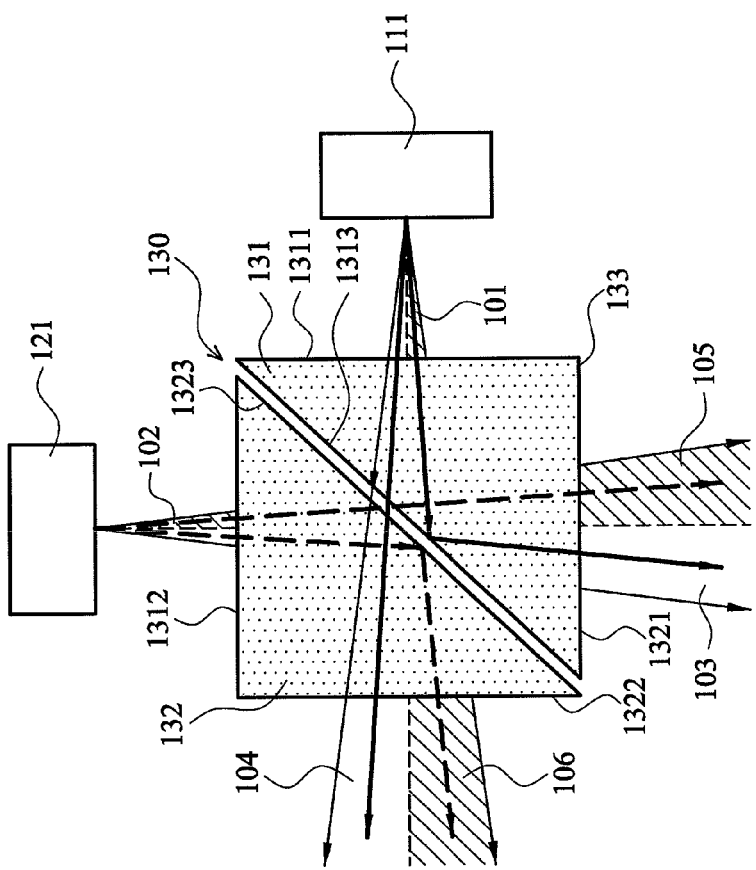
FIG. 3B shows the detailed structure and operation principle of a splitting unit of the embodiment of the invention.

FIG. 3A shows the major elements and light paths of the illumination module. FIG. 3B shows the detailed structure and operation principle of the splitting unit 130. With reference to FIGS. 3A and 3B, the splitting unit 130 comprises a first inner total reflective prism 131 and a second inner total reflective prism 132. The first inner total reflective prism 131 comprises a first entering surface 1311, a first exiting surface 1321 and a first critical surface 1313. The second inner total reflective prism 132 comprises a second entering surface 1312, a second exiting surface 1322 and a second critical surface 1323. The first critical surface 1313 corresponds to the second critical surface 1323, and a first gap 133 is formed between the first critical surface 1313 and the second critical surface 1323. The first gap 133 is between 0.005 mm~0.1 mm The first beam 101 is emitted from the light pipe 111, and enters the splitting unit 130 through the first entering surface 1311. The first sub-beam 103 leaves the splitting unit 130 through the first exiting surface 1321, and the second sub-beam 104 leaves the splitting unit 130 through the second exiting surface 1322. An included angle between the first beam 101 and a first normal line of the first critical surface 1313 is between 30°~45.

The second beam 102 is emitted from the light pipe 121, and enters the splitting unit 130 through the second entering surface 1312. The third sub-beam 105 leaves the splitting unit 130 through the first exiting surface 1321, and the fourth sub-beam 106 leaves the splitting unit 130 through the second exiting surface 1322. An included angle between the second beam 102 and a second normal line of the second critical surface 1323 is between 30°~45°.

Figure 4A:
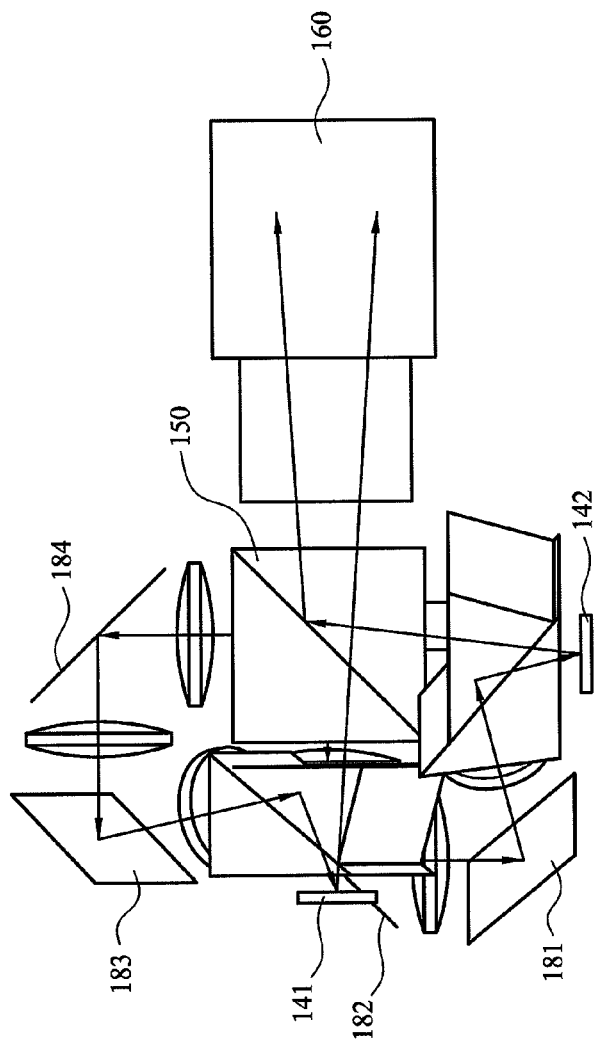
FIG. 4A shows the major elements and light paths of an image module of the embodiment of the invention.
Figure 4B:
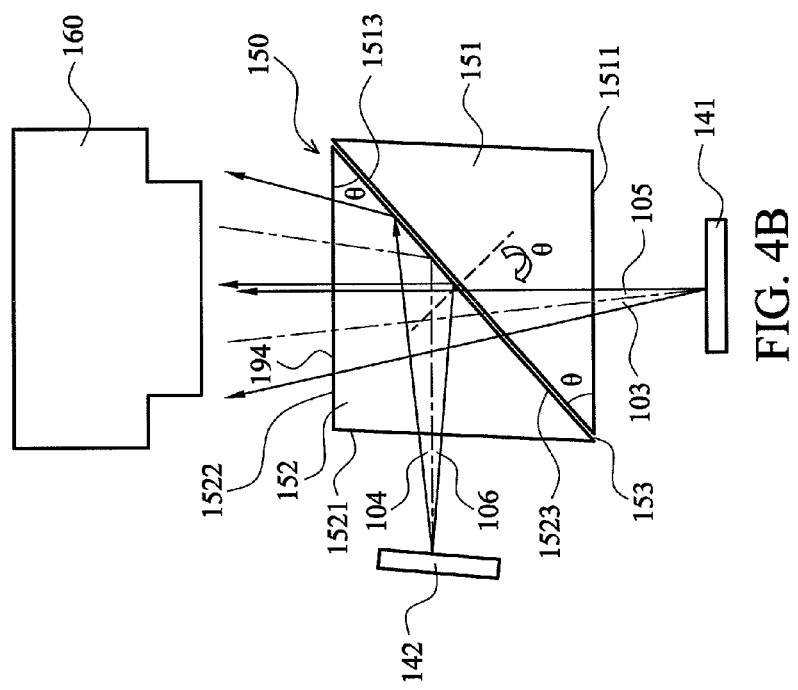
FIG. 4B shows the detailed structure and operation principle of a combining unit of the embodiment of the invention.

FIG. 4A shows the major elements and light paths of the image module. FIG. 4B shows the detailed structure and operation principle of the combining unit 150. With reference to FIGS. 4A and 4B, the combining unit 150 comprises a third inner total reflective prism 151 and a fourth inner total reflective prism 152. The third inner total reflective prism 151 comprises a third entering surface 1511 and a third critical surface 1513. The fourth inner total reflective prism 152 comprises a fourth entering surface 1521, a fourth exiting surface 1522 and a fourth critical surface 1523. The third critical surface 1513 corresponds to the fourth critical surface 1523, and a second gap 153 is formed between the third critical surface 1513 and the fourth critical surface 1523. The second gap 153 is between 0.005 mm~0.1 mm In the first state, the first sub-beam 103 is modulated by the first modulating element 141, and enters the combining unit 150 through the third entering surface 1511. The second sub-beam 104 is modulated by the second modulating element 142, and enters the combining unit 150 through the fourth entering surface 1521. The first sub-beam 103 and the second sub-beam 104 leave the combining unit 150 through the fourth exiting surface 1522, and enter the projection lens unit 160. An included angle between the first sub-beam and a third normal line of the third critical surface is between 25°~40°, and an included angle between the second sub-beam and a fourth normal line of the fourth critical surface is between 35°~50°.

In the second state, the third sub-beam 105 is modulated by the first modulating element 141, and enters the combining unit 150 through the third entering surface 1511. The fourth sub-beam 106 is modulated by the second modulating element 142, enters the combining unit 150 through the fourth entering surface 1521. The third sub-beam 105 and the fourth sub-beam 106 leave the combining unit 150 through the fourth exiting surface 1522, and enter the projection lens unit 160. An included angle between the third sub-beam and a third normal line of the third critical surface is between 25°~40°, and an included angle between the fourth sub-beam and a fourth normal line of the fourth critical surface is between 35°~50°.

In a modified example, when a refractive index n of the combining unit 150 is 1.5168, an included angle θ between the third critical surface 1513 and the third entering surface 1511 is 41.246°. In another modified example, when a refractive index n of the combining unit 150 is 1.71736, an included angle θ between the third critical surface 1513 and the third entering surface 1511 is 35.6117°.

The projection screen comprises the front cylinder lens array 179, the rear cylinder lens array 178 and the diffusing surface 170. The rear cylinder lens array 178 faces the combining unit 150. The diffusing surface 170 is located between the front cylinder lens array 179 and the rear cylinder lens array 178. The front cylinder lens array 179 faces a watching position. The pixel images of the first modulating element 141 and the second modulating element 142 match the pitch of the rear cylinder lens array 178. The pitch of the front cylinder lens array 179 covers two pixel images to project adjacent pixels in two different directions, and to produce spatial-multiples impression.

Each of the first light source 110 and the second light source 120 can comprise a plurality of lighting elements (Light Emitting Diode), and the lighting elements can be time division lighted.

The projector of the embodiment of the invention utilizes the splitting unit and the combining unit which are composed by inner total reflective prisms to split and combine light beams. Additionally, traveling directions of the light beams are controlled by first and second modulating elements. The energy of the first beam and the second beam are therefore sufficiently used.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A projector, comprising:
 a first light source, providing a first beam in a first state;
 a second light source, providing a second beam in a second state;
 a splitting unit, receiving the first beam and the second beam, splitting the first beam into a first sub-beam and a second sub-beam, and splitting the second beam into a third sub-beam and a fourth sub-beam;
 a first modulating element, receiving the first sub-beam and the third sub-beam from the splitting unit;
 a second modulating element, receiving the second sub-beam and the fourth sub-beam from the splitting unit;
 a projection lens unit;
 a projection screen, comprising a rear cylinder lens array and a diffusing surface; and
 a combining unit, wherein when in the first state, the combining unit respectively receives the first sub-beam and the second sub-beam from the first modulating element and the second modulating unit, the first sub-beam and the second sub-beam travel from the combining unit, pass through a first and a second position of the projection lens unit, imaged by a cylinder lens of the rear cylinder lens array, and are projected to a first image position and second image position of the diffusing surface of the projection screen, and in the second state, the combining unit respectively receives the third sub-beam and the fourth sub-beam from the first modulating element and the second modulating unit, the third sub-beam and the fourth sub-beam travel from the combining unit, pass through a third and a fourth positions of the projection lens unit, imaged by another cylinder lens of the rear cylinder lens array, and are projected to a third image position and fourth image position of the diffusing surface of the projection screen, wherein the third image position is located between the first image position and the second image position, and the second image position is located between the third image position and the fourth image position.

2. The projector as claimed in claim 1, wherein the splitting unit comprises a first inner total reflective prism and a second inner total reflective prism, the first inner total reflective prism comprises a first entering surface, a first exiting surface and a first critical surface, the second inner total reflective prism comprises a second entering surface, a second exiting surface and a second critical surface, wherein the first critical surface corresponds to the second critical surface, and a first gap is formed between the first critical surface and the second critical surface.

3. The projector as claimed in claim 2, wherein the first gap is between 0.005 mm~0.1 mm.

4. The projector as claimed in claim 2, wherein the first beam enters the splitting unit through the first entering surface, the first sub-beam leaves the splitting unit through the first exiting surface, and the second sub-beam leaves the splitting unit through the second exiting surface.

5. The projector as claimed in claim 4, wherein an included angle between the first beam and a first normal line of the first critical surface is between 30°~45°.

6. The projector as claimed in claim 4, wherein the second beam enters the splitting unit through the second entering surface, the third sub-beam leaves the splitting unit through the first exiting surface, and the fourth sub-beam leaves the splitting unit through the second exiting surface.

7. The projector as claimed in claim 6, wherein an included angle between the second beam and a second normal line of the second critical surface is between 30°~45°.

8. The projector as claimed in claim 1, wherein the first modulating element and the second modulating element are spatial light modulators.

9. The projector as claimed in claim 1, wherein the combining unit comprises a third inner total reflective prism and a fourth inner total reflective prism, the third inner total reflective prism comprises a third entering surface and a third critical surface, the fourth inner total reflective prism comprises a fourth entering surface, a fourth exiting surface and a fourth critical surface, wherein the third critical surface corresponds to the fourth critical surface, and a second gap is formed between the third critical surface and the fourth critical surface.

10. The projector as claimed in claim 9, wherein the second gap is between 0.005 mm~0.1 mm.

11. The projector as claimed in claim 9, wherein the first sub-beam enters the combining unit through the third entering surface, the second sub-beam enters the combining unit through the fourth entering surface, and the first sub-beam and the second sub-beam leave the combining unit through the fourth exiting surface.

12. The projector as claimed in claim 11, wherein an included angle between the first sub-beam and a third normal line of the third critical surface is between 25°~40°, and an included angle between the second sub-beam and a fourth normal line of the fourth critical surface is between 35°~50°.

13. The projector as claimed in claim 11, wherein the third sub-beam enters the combining unit through the third entering surface, the fourth sub-beam enters the combining unit through the fourth entering surface, and the third sub-beam and the fourth sub-beam leave the combining unit through the fourth exiting surface.

14. The projector as claimed in claim 13, wherein an included angle between the third sub-beam and a third normal line of the third critical surface is between 25°~40°, and an included angle between the fourth sub-beam and a fourth normal line of the fourth critical surface is between 35°~50°.

* * * * *